Nov. 10, 1959     O. P. WELSH     2,911,889
BOX FOLDING MACHINE
Filed June 25, 1954     12 Sheets-Sheet 1
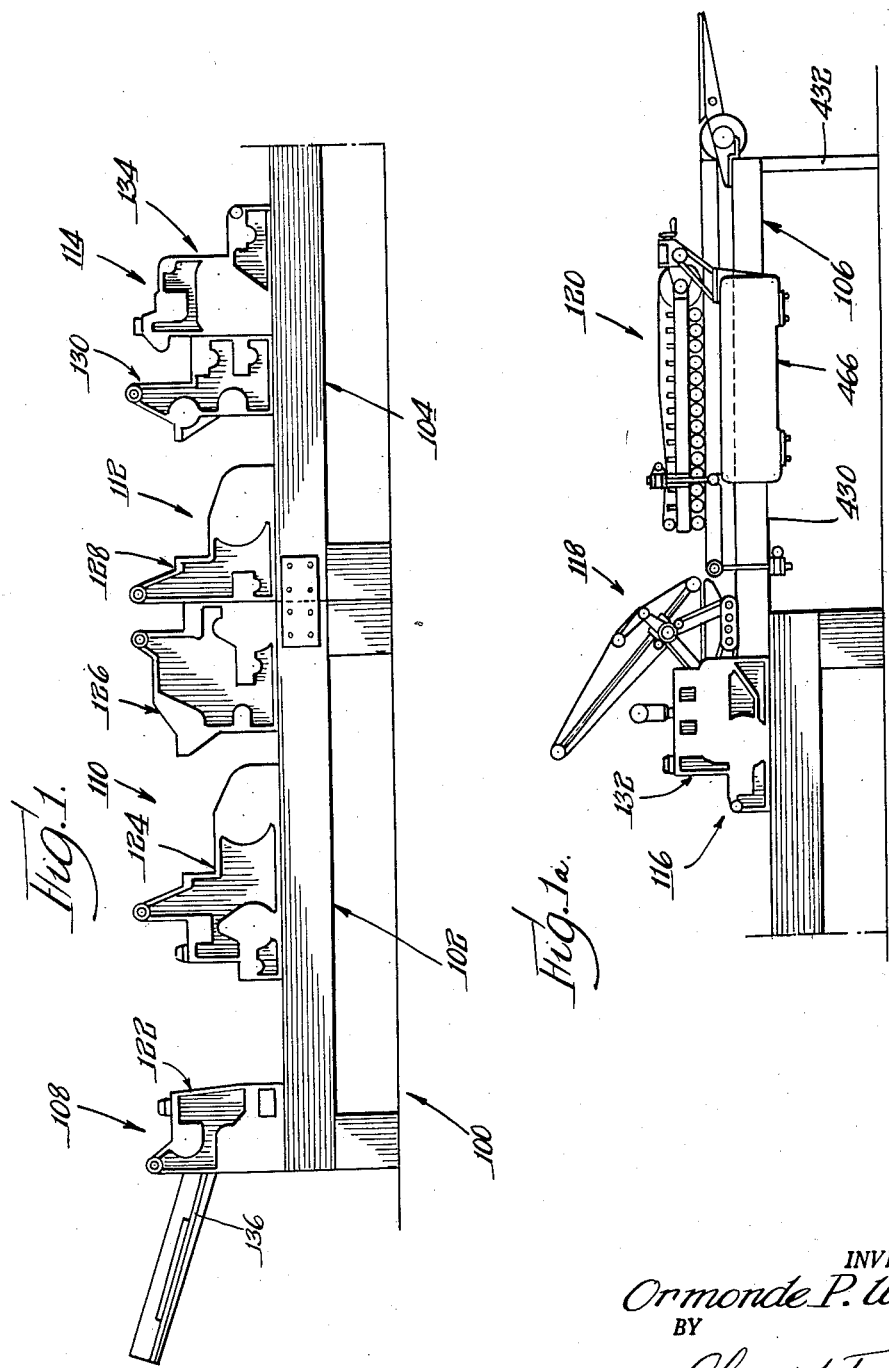
INVENTOR.
Ormonde P. Welsh
BY
Olson & Trexler
attys.

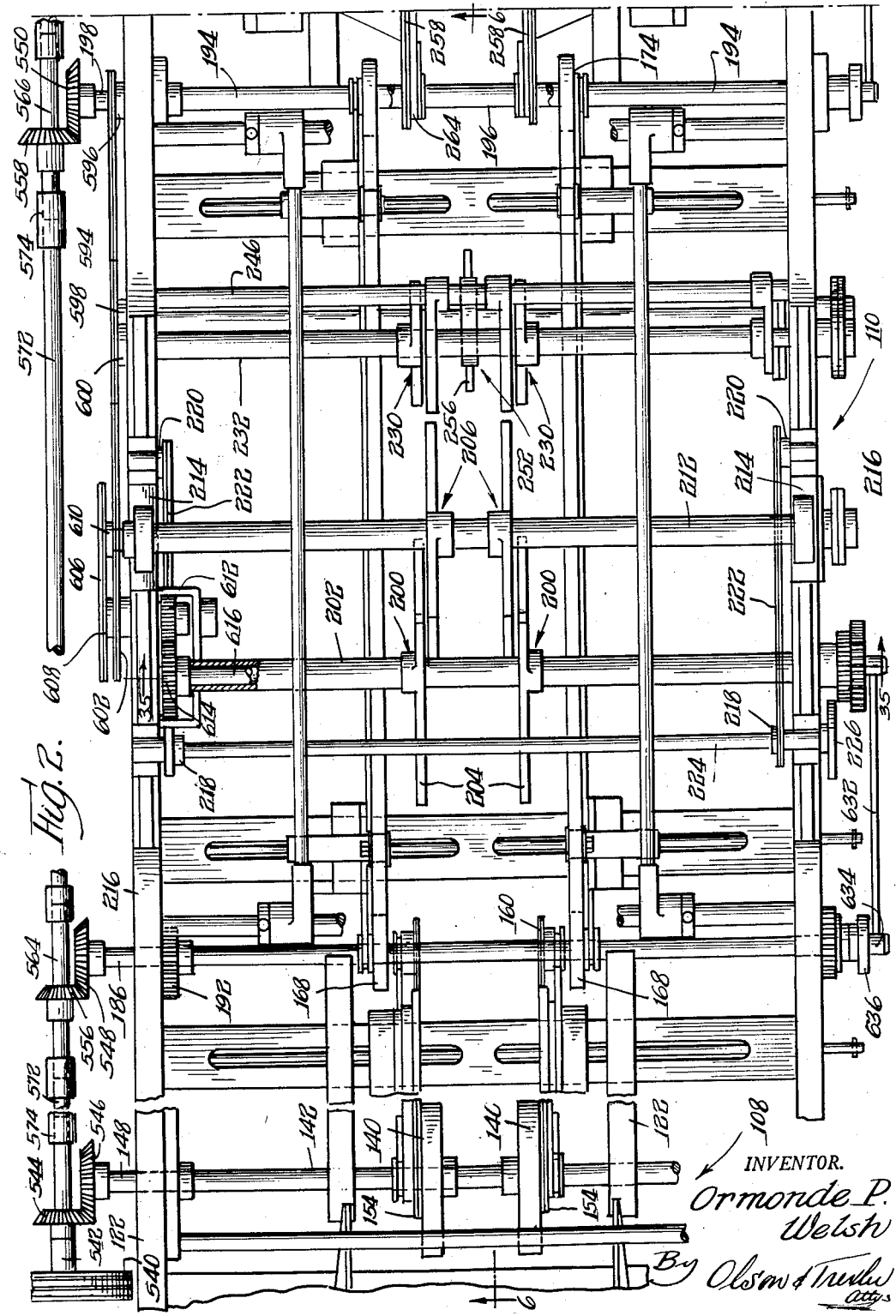

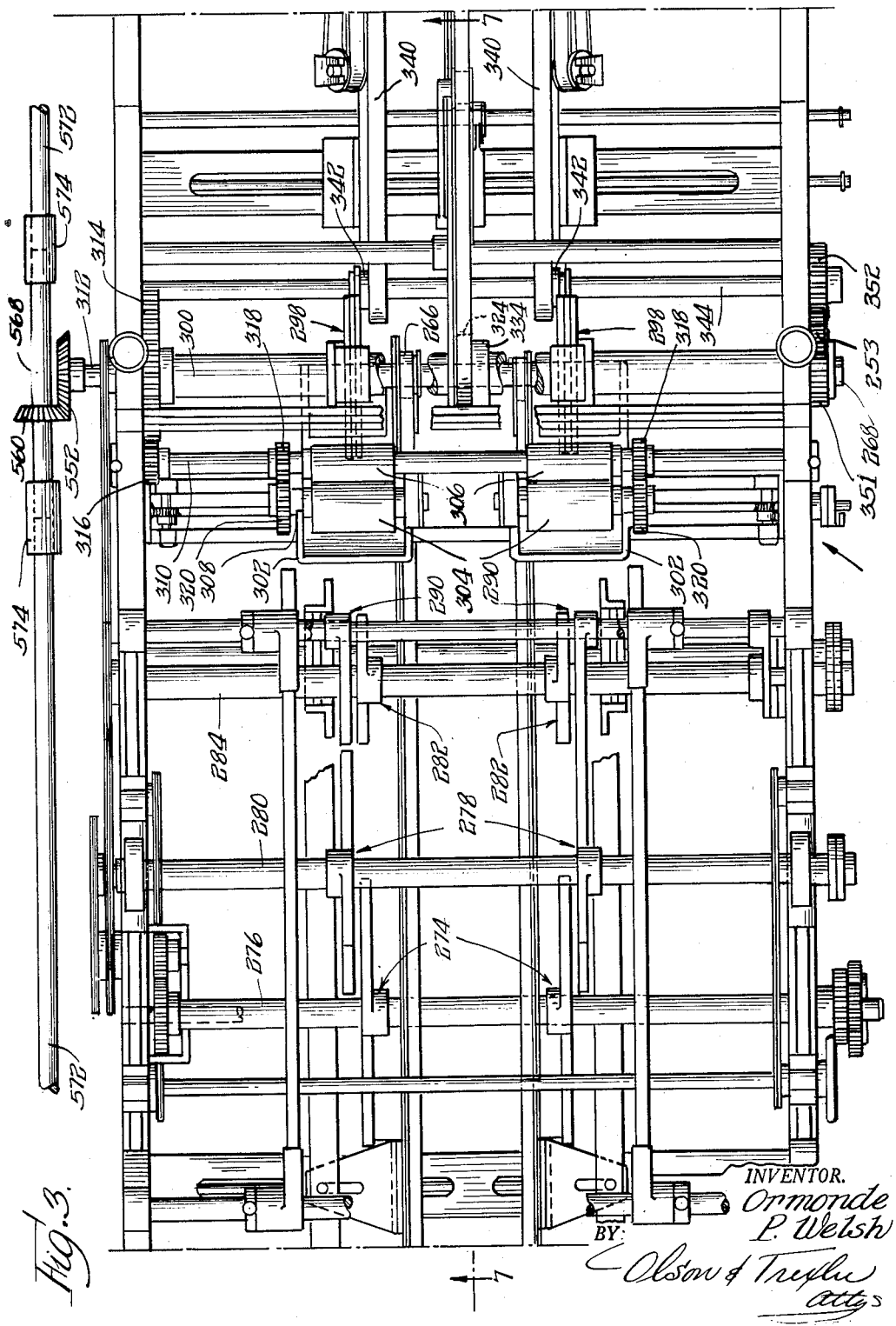

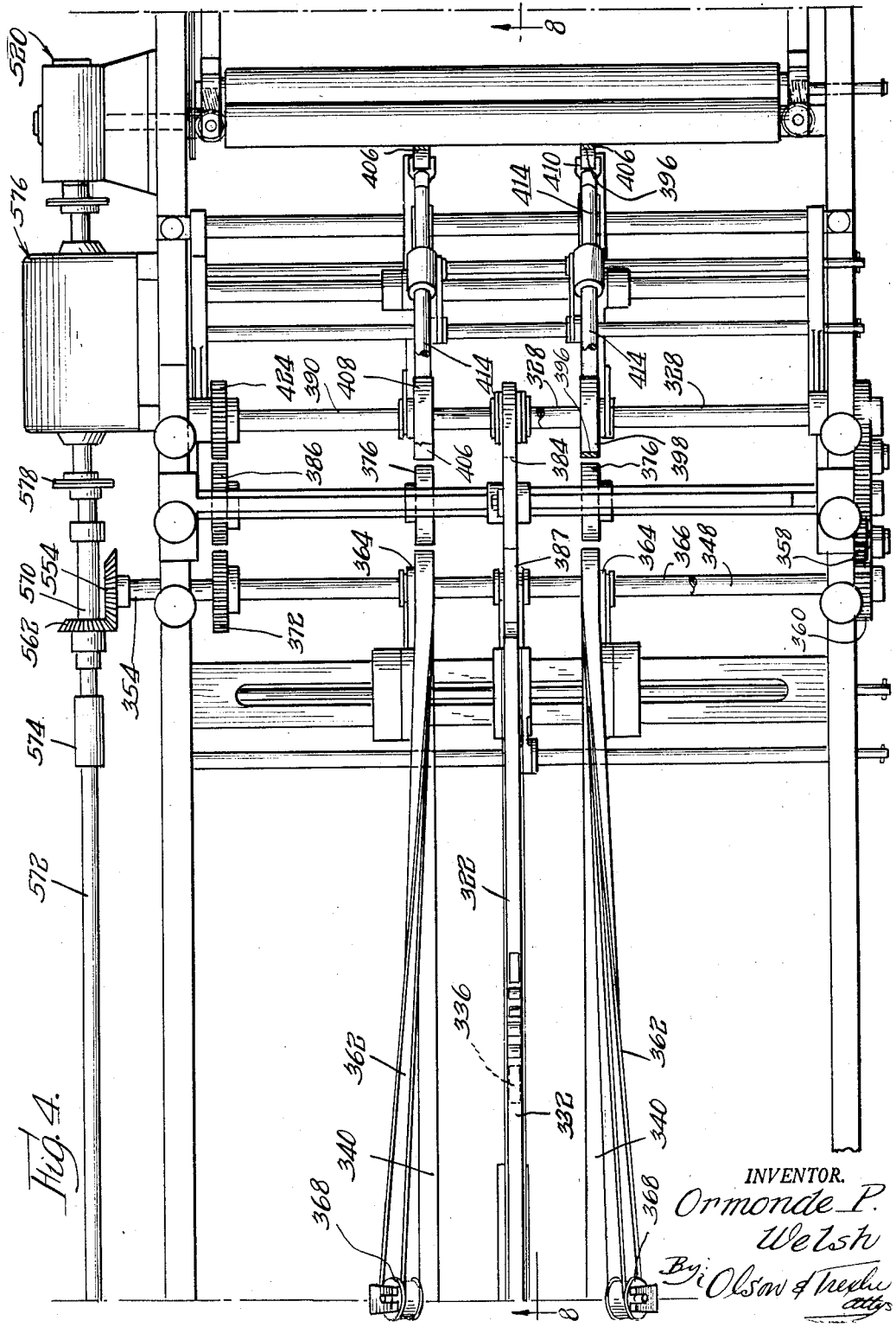

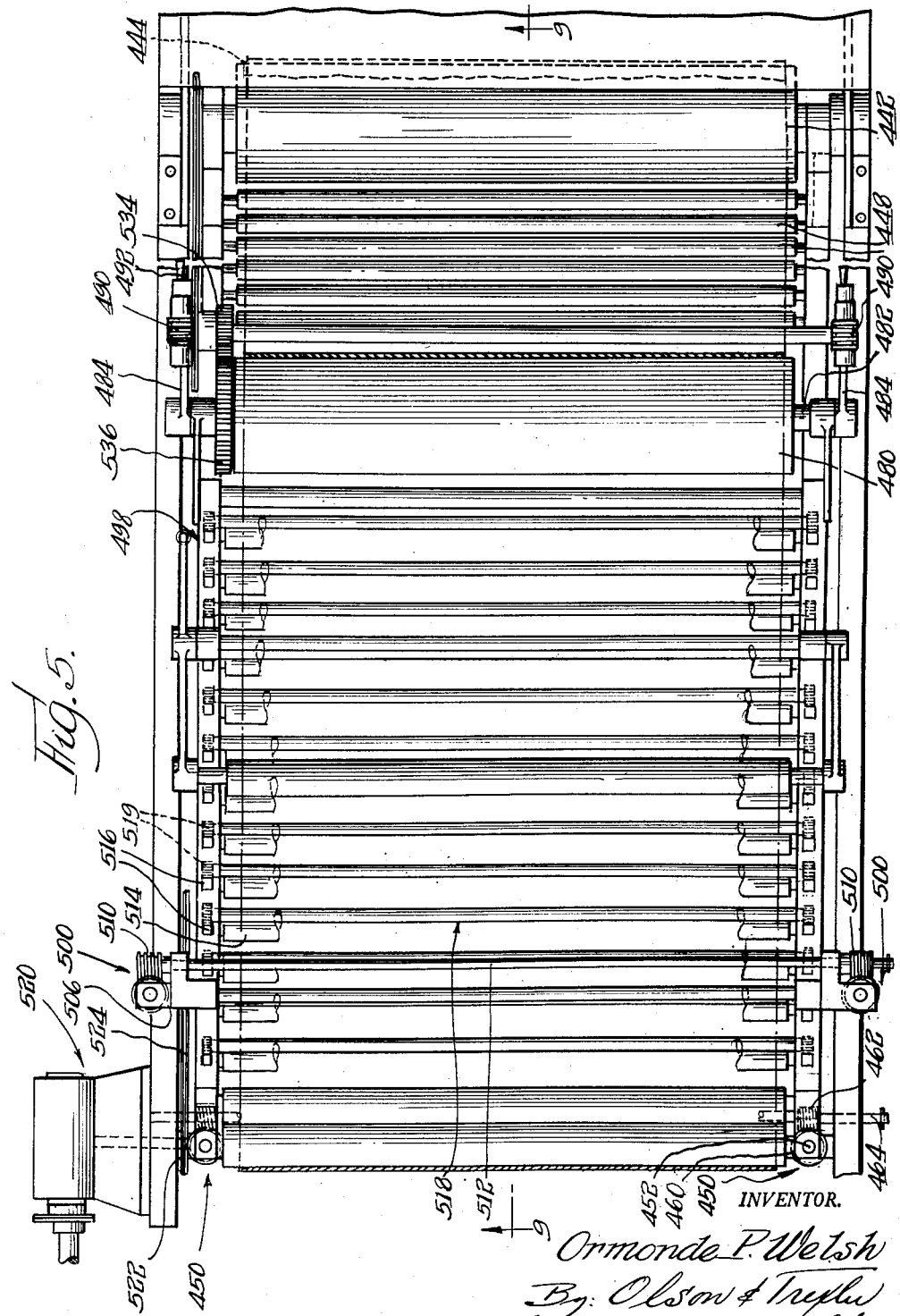

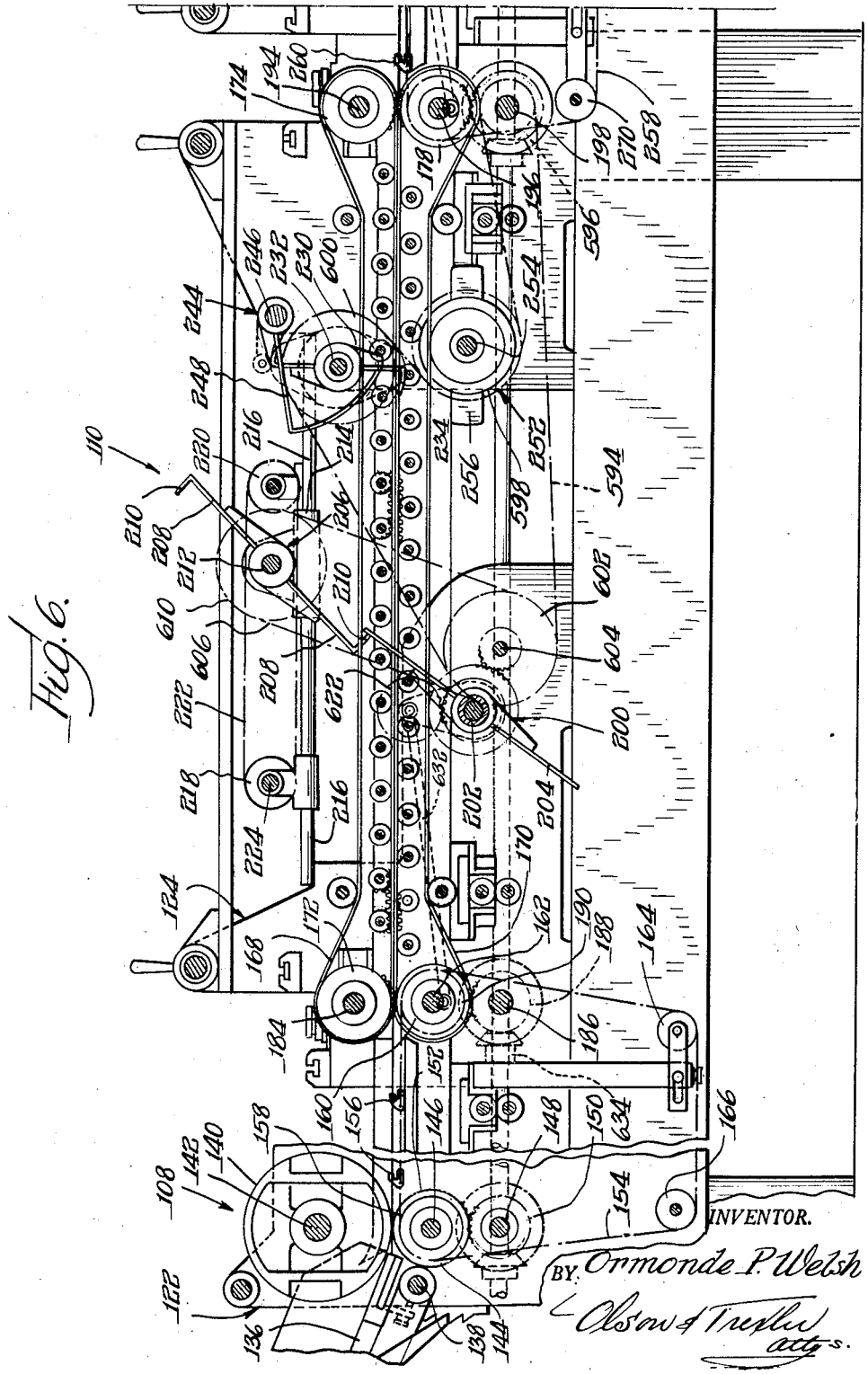

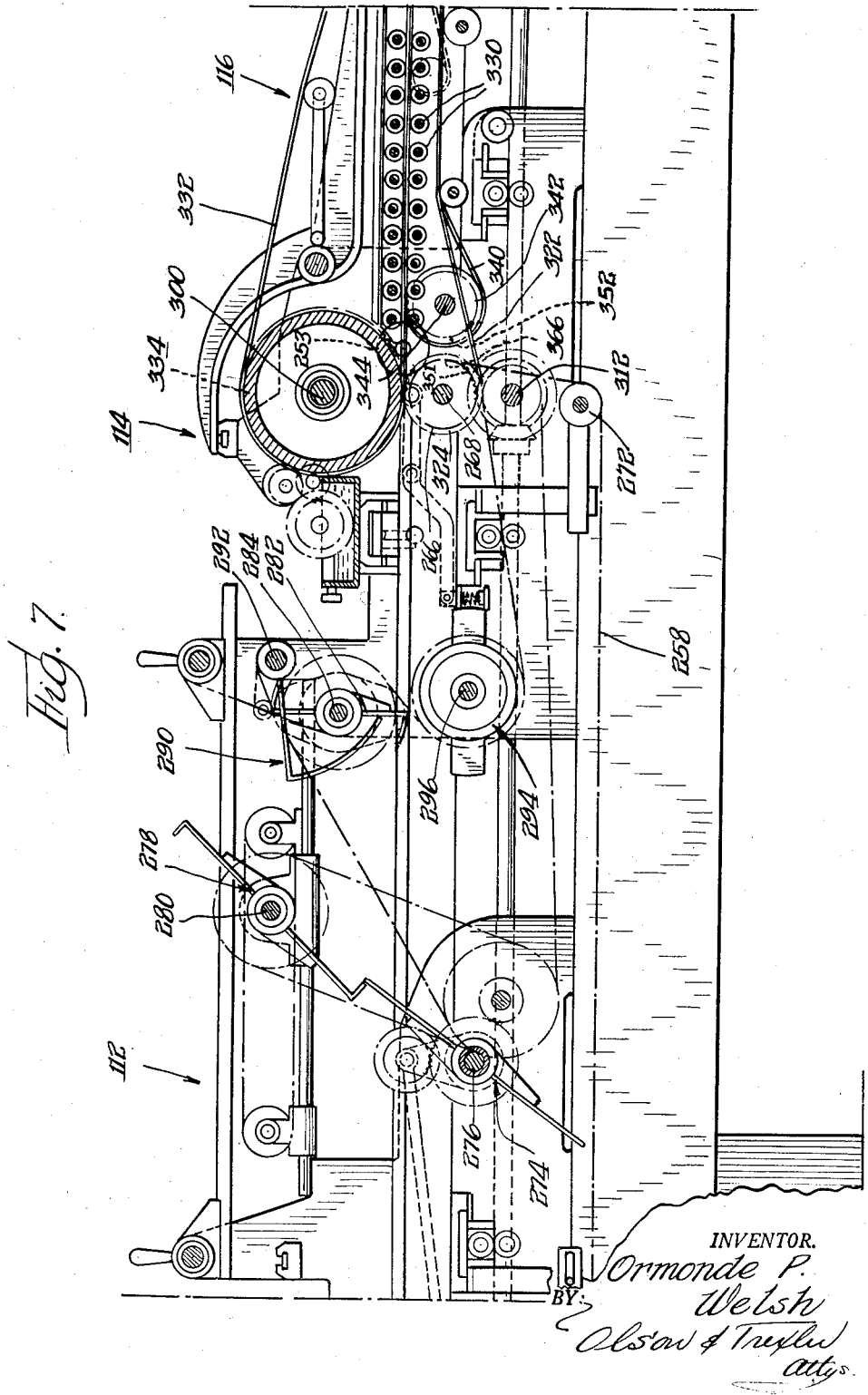

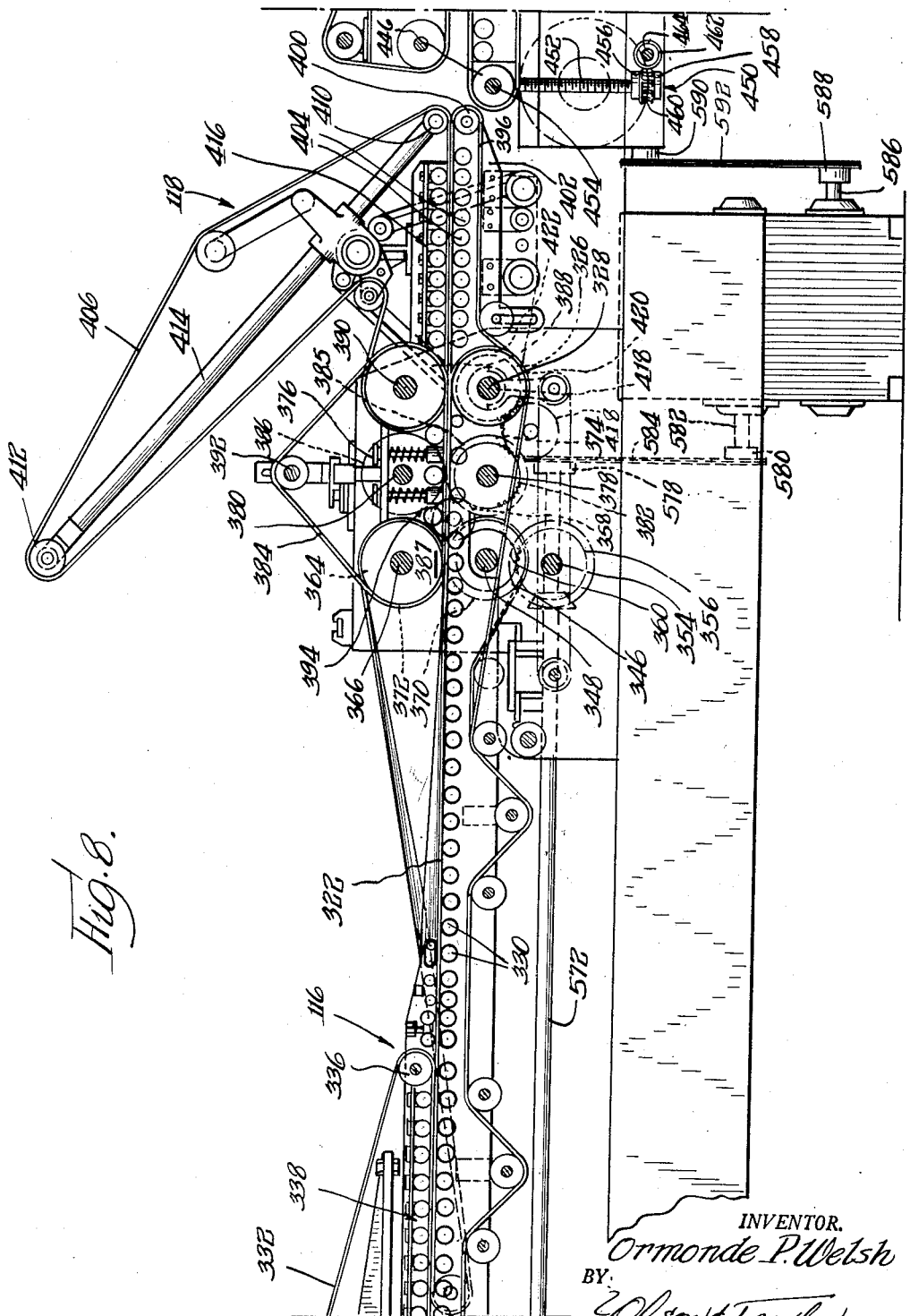

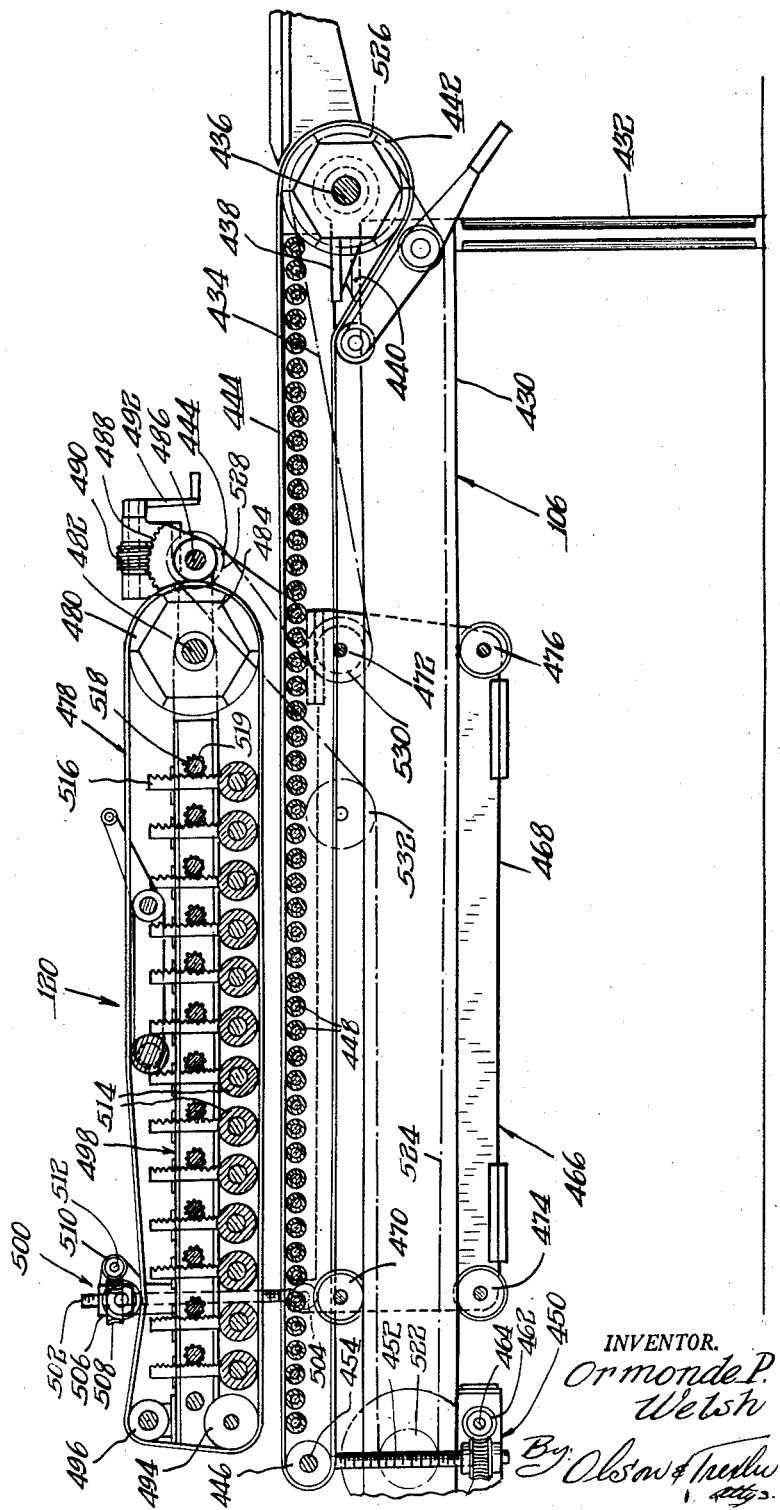

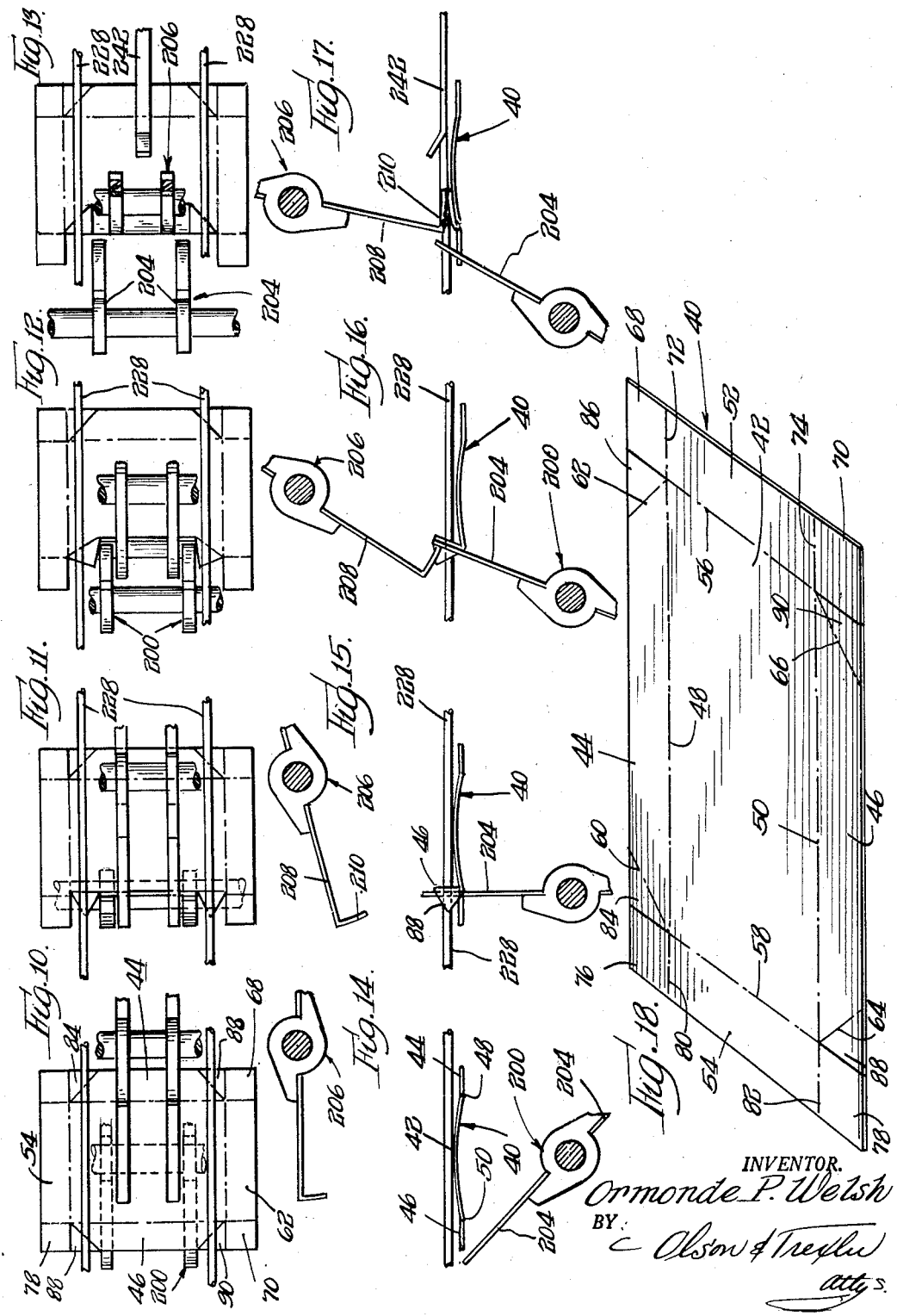

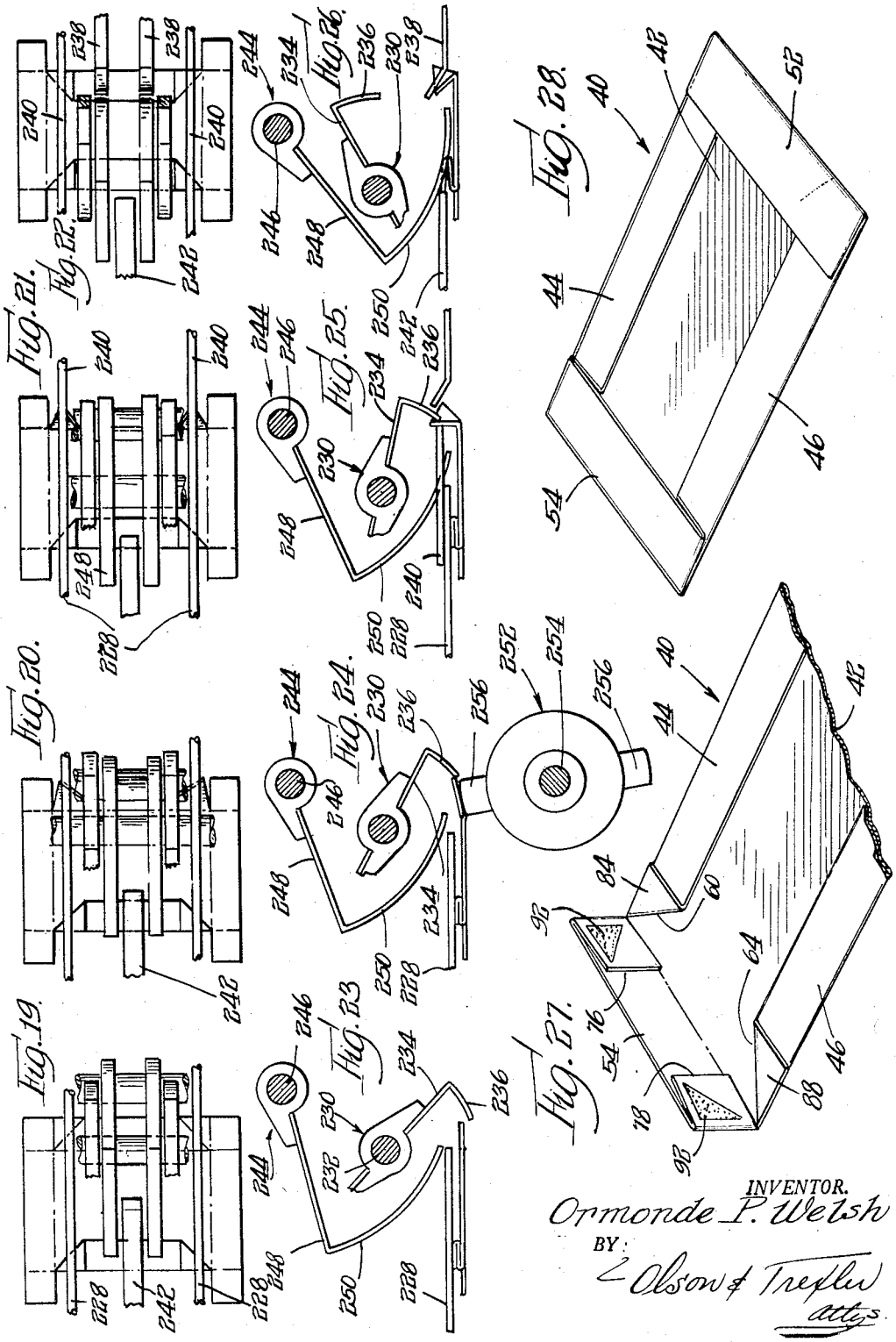

Nov. 10, 1959    O. P. WELSH    2,911,889
BOX FOLDING MACHINE
Filed June 25, 1954    12 Sheets-Sheet 12
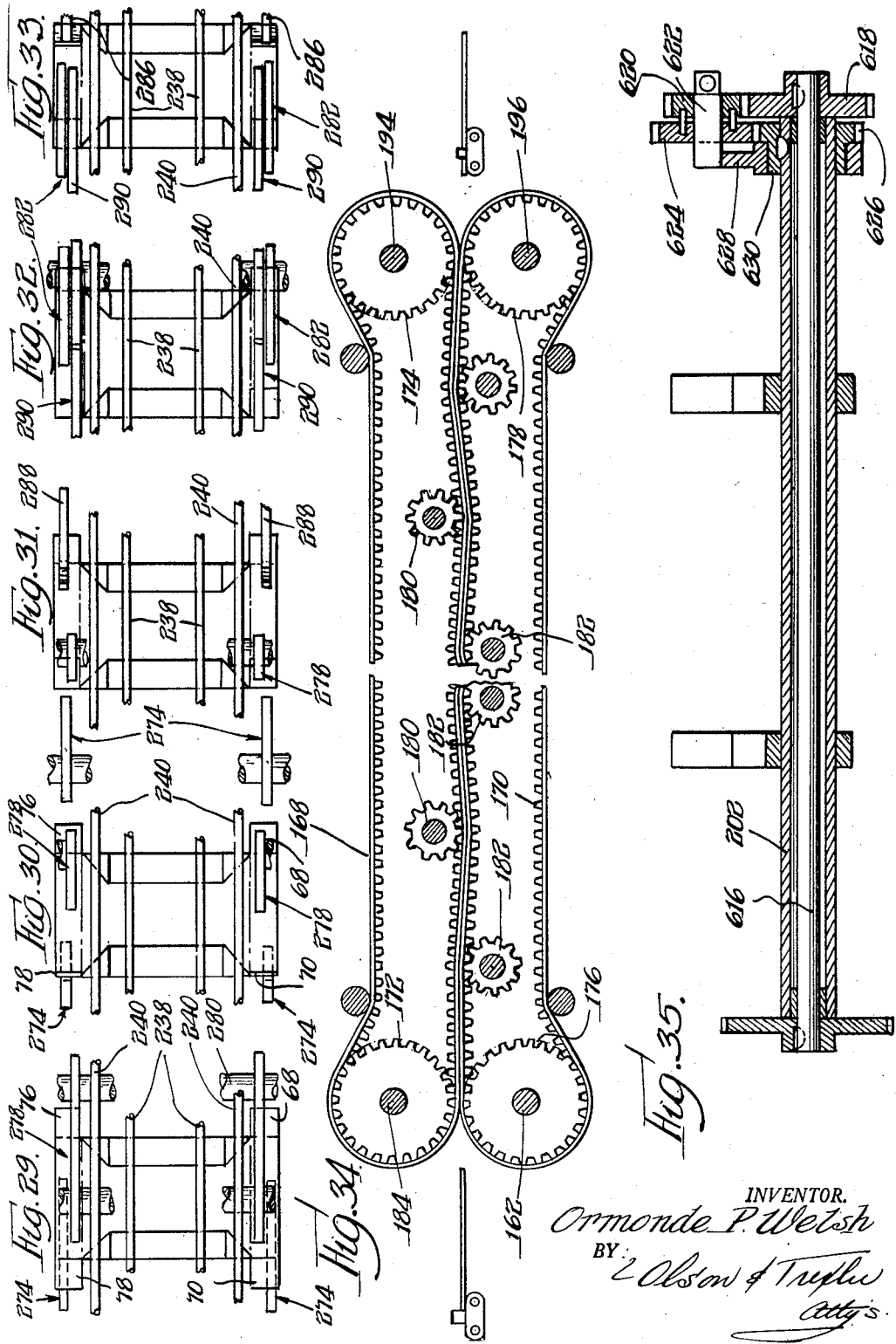
INVENTOR.
Ormonde P. Welsh
BY Olson & Trexler
attys United States Patent Office 2,911,889
Patented Nov. 10, 1959

2,911,889

BOX FOLDING MACHINE

Ormonde P. Welsh, Minneapolis, Minn.

Application June 25, 1954, Serial No. 439,181

24 Claims. (Cl. 93—49)

The present invention relates to a novel method and apparatus for folding box blanks and more particularly to a novel method and apparatus for folding knockdown or collapsible type boxes so that the folded blank is substantially flat to facilitate shipping and storing.

Apparatus heretofore used for folding boxes of the type contemplated herein has in general been relatively complicated so that manufacturing and maintenance costs have been excessive. Furthermore, considerable difficulty has been experienced in preventing improper folding or bending of the blanks with the result that the blanks may be injured and the apparatus jammed. It is therefore an object of the present invention to provide a novel method and apparatus for folding box blanks or the like rapidly and economically and in a manner such that any possibility of injury to the blanks or jamming of the apparatus is substantially reduced.

Another object of the present invention is to provide a novel apparatus for folding blanks which apparatus is constructed so that it may be relatively economically manufactured and maintained.

A further object of the present invention is to provide a novel apparatus for folding box blanks and the like in a manner so that the blanks are retained against improper bending or buckling and the folding operation is facilitated.

Still another object of the present invention is to provide a novel apparatus of the above described type which is readily adaptable for processing box blanks having flaps or sidewalls that overlap when folded as well as blanks having non-overlapping flaps.

Another object of the present invention is to provide a novel apparatus for folding box blanks which is of simplified construction so that portions or units thereof may be added thereto or replaced without substantially disturbing other units of the apparatus.

In connection with the object set forth in the preceding paragraph it is a further object to provide a box folding apparatus which may be readily separated into individual units for storing or shipping and then easily reassembled.

A more specific object of the present invention is to provide a novel box folding apparatus wherein the blanks are positively held and fed throughout the entire apparatus to insure proper positioning thereof and folding of the blanks.

Other objects and advantages of the present invention will become apparent from the following description and the accompanying drawings wherein:

Figs. 1 and 1a taken together are a side elevational view showing the unit frame construction of the apparatus of this invention;

Figs. 2, 3, 4 and 5 taken together provide a plan view of the apparatus of this invention;

Fig. 6 is a vertical cross-sectional view taken along line 6—6 in Fig. 2;

Fig. 7 is a vertical cross-sectional view taken along line 7—7 in Fig. 3;

Fig. 8 is a vertical cross-sectional view taken along line 8—8 in Fig. 4;

Fig. 9 is a vertical cross-sectional view taken along line 9—9 in Fig. 5;

Figs. 10 through 13 are somewhat schematic plan views illustrating how the trailing edge of the blank is folded;

Figs. 14 through 17 are somewhat schematic elevational views respectively corresponding to Figs. 10 through 13;

Fig. 18 is a perspective view of a blank of the type to be folded by the apparatus of this invention;

Figs. 19 through 22 are somewhat schematic plan views illustrating the manner in which the leading edge of the blank is folded;

Figs. 23 through 26 are somewhat schematic elevational views respectively corresponding to Figs. 19 through 22;

Fig. 27 is a fragmentary perspective view showing the blank partially folded;

Fig. 28 is a perspective view showing a blank completely folded;

Figs. 29 through 33 are somewhat schematic plan views illustrating the manner in which trailing and leading flaps on the box end walls are folded by the apparatus of this invention;

Fig. 34 is an enlarged fragmentary cross-sectional view similar to Fig. 6 and showing certain novel features of this invention in greater detail; and Fig. 35 is an enlarged cross-sectional view taken along line 35—35 in Fig. 2.

While the present invention may be adapted for processing various knockdown or collapsible boxes the particular embodiment of the invention illustrated is especially useful for folding box blanks 40 shown best in Figs. 18, 27 and 28. Each blank 40 includes a central bottom panel 42 having side portions or flaps 44 and 46 articulated thereto along parallel scored bend lines 48 and 50. End portions or flaps 52 and 54 are also articulated to the body or bottom of the blank along scored bend lines 56 and 58. In order to connect the ends and the sides of the box blank in the manner to permit collapsing thereof, the sides are provided with diagonal scored bend lines 60, 62, 64 and 66. The ends 52 and 54 are respectively provided with flaps 68 and 70 joined to the blank along scored bend lines 72 and 74 and flaps 76 and 78 joined to the blank along scored bend lines 80 and 82. With this structure the sides are first folded over the bottom as shown in Fig. 27 and corner portions 84, 86, 88, and 90 of the sides are bent backwardly along the diagonal bend lines. The flaps 68, 70, 76 and 78 are then bent over the ends and patches 92 of glue are applied thereto as shown in Fig. 27 whereupon the ends are bent over the bottom panel as shown in Fig. 28 so that the glued flaps are pressed against the folded corner portions of the sides. The specific structure of the box blank 40 is well known and forms no part of the present invention.

In accordance with the present invention the blanks 40 are folded from the flat condition shown in Fig. 18 to the collapsed condition shown in Fig. 28 by an apparatus generally designated by the numeral 100 and illustrated best in Figs. 1 through 9 wherein like parts are designated by the same numerals. The apparatus 100 includes a plurality of main frame sections 102, 104 and 106 which are arranged in a straight line to conserve floor space and which may be easily connected or disconnected from each other to facilitate shipping and storing. Mounted adjacent one end of the main frame is a blank feeding unit 108 for separating and feeding blanks from a stack. The blanks are fed in a manner described more fully below to a first folding unit 110 mounted on the main frame which is adapted to fold the side portions 44 and 46 of the blanks and also to fold the diagonal corner portions of the sides. From the folding unit 110 the blanks are directed to a second folding unit 112 which is adapted to fold the flaps 68, 70, 76 and 78 onto the ends 52 and 54 of the blanks. The blanks are then fed past glue applying means 114 to an end folding unit 116 which folds the ends of the blanks to the positions shown in Fig. 28. After the blanks have been completely folded they are directed by a discharging mechanism 118 to a unit 120 adapted to receive and convey the processed blanks in stacked relationship.

The unit construction of the apparatus 100 is well illustrated in Figs. 1 and 1a which show how the primary blank processing units are mounted on the main frame by individual relatively easily detachable sub-frame members. Thus the feeding unit 108 is mounted between a pair of spaced sub-frame members 122. The first folding unit 110 is supported between two pairs of sub-frame members 124 and 126 and the second folding unit is similarly supported between two pairs of separate sub-frame members 128 and 130. The end folding unit 116 is supported between forward and rear pairs of sub-frame members 132 and 134. The rear pair of sub-frame members 134 also carry the glue applying mechanism 114 and the forward pair of sub-frame members 132 and carry the blank discharging mechanism 118. With this structure in combination with the simplified structure of the various units described in more detail hereinbelow, it will be appreciated that substantial economies may be effected both in manufacturing and maintenance costs since each unit may be individually assembled and then mounted on the main frame or may be individually removed and replaced without substantially disturbing the other units.

The feeding unit 108 may be of any suitable construction and, therefore, need not be described in detail. In general, the particular feeding unit 108 illustrated in Figs. 2 and 6 includes a board or platform 136 pivotally mounted on a shaft 138 extending between the sub-frame members 122 for supporting a supply of blanks. A pair of combing wheels 140 are fixed on a shaft 142 extending between and journaled in the sub-frame members 122 cooperate with feed rollers 144 mounted on a rotatable shaft 146. The shaft 146 is driven from a drive shaft 148 through gears 150 and 152. The drive shaft 148 is in turn driven by means which is described fully hereinbelow. From the feed rollers 144 the blanks are picked up and conveyed in predetermined timed relationship by a pair of feed chains 154 carrying blank engaging and feeding dogs 156. Each of the chains 154 encircles a sprocket wheel 158 fixed on the shaft 146 and a second sprocket wheel 160 fixed on a shaft 162 extending between and journaled in the sub-frame members 124 of the folding unit 110. The feeding chains are also passed around idler sprocket wheels 164 and 166.

The blanks are positively advanced by the feed dogs 156 and inserted between pairs of upper and lower feeding belts 168 and 170. As shown best in Fig. 2 one pair of upper and lower feed belts is arranged along each side of the path of travel of the blanks. The blanks are advanced through the apparatus with the side portions 44 and 46 forming the leading and trailing edges and the pairs of feeding belts 168 and 170 are disposed to engage ends 52 and 54 of the blanks without interfering with the side portions 44 and 46. It has been found that when ordinary belts are used for the feeding belts 168 and 170 any slight variation in the tension of the belts causes one pair of belts to feed one end of the blank faster than the other so that the blank is twisted. This difficulty has been eliminated in accordance with the present invention by providing the belts 168 and 170 with integral teeth as shown best in Fig. 34. The belt 168 encircles sprocket wheels 172 and 174 and the belt 170 encircles similar sprocket wheels 176 and 178. With this structure it is seen that all of the belts 168 and 170 may be positively driven in timed relationship with each other whereby any possibility of twisting the blanks is eliminated.

In accordance with another feature of the present invention the adjacent runs of the belts 168 and 170 are undulated so that the blanks held therebetween are bent in a manner to facilitate folding of the sides. This operation will be described in more detail below and by referring to Fig. 34 it is seen that the adjacent runs of the feeding belts are pressed together and undulated by a plurality of sprocket-like rollers 180 and 182 which may be supported in any suitable manner.

The sprocket wheel 176 is mounted on the rotatable shaft 162 and sprocket wheel 172 is similarly mounted on a rotatable shaft 184 journaled in the sub-frame members 124. The shafts 162 and 184 are driven from a drive shaft 186 through gears 188, 190 and 192. The sprocket wheels 174 and 178 are respectively mounted on rotatable shafts 194 and 196 journaled in and extending between the sub-frame members 126. These shafts are also positively driven from a drive shaft 198 through suitable gears.

In accordance with the present invention the folding unit 110 is provided with relatively simple yet very effective means for folding the leading and trailing portions of the blanks. This means is illustrated best in Figs. 2, 6, 10–17, and 19–26. In order to fold the trailing portions or sides of the blanks a pair of lower folding members 200 are mounted on a rotatable hollow shaft 202 disposed beneath the feeding cog belts 168 and 170. Each of the rotatable members 200 includes a pair of blank engaging and folding arms 204 extending radially in opposite directions. The rotatable members 200 are driven so that the arms 204 engage the trailing edge of the blanks and fold the trailing side portion about 90° from the plane of the blank. A pair of upper folding members 206 are provided for further folding the trailing side of the blank about 90° or in other words for folding the side of the blank downwardly against the blank body. Each folding member 206 also includes a pair of oppositely extending arms 208, which arms preferably terminate in arcuate fingers 210, which fingers are adapted to fold and hold the trailing side as shown best in Figs. 16 and 17. The folding members 206 are mounted on a rotatable shaft 212. The shaft 212 is adjustably mounted in order to adapt the apparatus for handling box blanks of various sizes and this is accomplished by supporting the opposite ends of the shaft on blocks 214 which are slidably disposed on bars 216 extending between the sub-frame members 124 and 126. On each bar 216 is mounted a pair of sprocket wheels 218 and 220 which carry a chain 222. Each of the chains 222 is connected to the slide blocks 214 and a shaft 224 connects the sprocket wheels 218 so that upon rotation of the shaft 224 by means of a hand wheel 226 the slide blocks and thus the rotatable folding members 206 may be adjusted longitudinally of the apparatus.

When the apparatus of this invention is used to fold box blanks of the type illustrated in Fig. 18 means is provided for folding the diagonal corner portions of the trailing side of the blank at the same time that the side is folded. This means includes a pair of fixed elongated bars 228 disposed above and in vertical alignment with the diagonal corner portions as shown best in Figs. 10–17. The folding bars 228 are preferably inclined slightly so that as the blank is advanced there beneath the diagonal corner portions are progressively folded while the trailing side is being folded.

The leading portions or sides of the blanks are folded by means including a pair of folding members 230 mounted on a rotatable shaft 232. As shown best in Figs. 6 and 23–26 each of the folding members 230 includes a pair of oppositely extending arms 234 having arcuate finger portions 236 extending in a direction opposite to the direction of rotation. The arms 234 are proportioned and driven so that the fingers 236 extend beneath the path of travel of the blanks. The blanks which are advanced along their path of travel at a rate which exceeds the rate of movement of the rotating arms along the path of travel engage the fingers 236 and are folded upwardly about 90° as shown best in Figs. 24 and 25. Complete folding of the leading sides of the blanks is obtained by providing a pair of fixed elongated folding bars 238 beneath which the partially folding leading side is advanced. The diagonal corner portions of the blank leading side are folded by elongated folding bars 240 similar to the above described folding bars 228. As shown best in Figs. 21 and 25 the folding bars 240 overlap the bars 228 so that folded diagonal corners of the trailing blank side are retained in their folded condition.

As the blanks are advanced from the trailing side folding members to the leading side folding members the trailing side is maintained in folded condition by means of an elongated bar 242. A space must be provided between the end of the bar 242 and the leading side folding bars 238 in order to permit the initial folding of the leading side. Thus, a pair of hold-down members 244 are provided for retaining the trailing side in folded condition while the leading side is being folded by the members 230. The hold-down members 244 are mounted on an oscillating shaft 246 an each includes a radially extending arm 248 terminating in an elongated arcuate portion 250. The oscillating shaft 246 is operated by the means described hereinbelow so that the arcuate arm portion 250 is withdrawn to permit folding of the leading blank side and then advanced downwardly to the position shown in Figs. 22 and 26 to hold the folded trailing side as the blank emerges from beneath the elongated bar 242 and until the blank has advanced beneath the folding bars 238.

In some instances and particularly when the blank side portions are relatively wide it has been found desirable to provide the leading side folding means with a device for preventing the side from sagging during initial folding thereof. As shown in Figs. 6 and 24 this device includes a member 252 mounted on a rotatable shaft 254 and carrying lifting blocks 256. The lifting member 252 is rotated by means described fully hereinbelow so that one of the blocks 256 lifts the leading blank side slightly as the leading edge of the blank engages the folding fingers 236. This prevents the mid portion of the leading blank side from sagging and facilitates the initial folding operation.

The blanks emerging from the folding unit 110 are picked up and conveyed through the folding unit 112 by a pair of feed chains 258 having feding dogs 260 spaced therearound. Each of the chains 258 passes around a sprocket wheel 264 mounted on the rotatable shaft 196 and another sprocket wheel 266 mounted on a rotatable shaft 268 journaled between the sub-frame members 134. Each of the feed chains 258 also encircles suitably supported idler wheels 270 and 272. While the blanks advance through the folding unit 112 the previously folded leading and trailing side portions and their respective diagonal corner portions are retained in folded condition by extensions of the folding bars 238 and 240.

The folding unit 112 which is illustrated best in Figs. 3, 7 and 29–33 is adapted to fold the end flaps 68, 70, 76 and 78 of the blanks onto the ends 52 and 54. The primary elements of the folding unit 112 are identical to corresponding elements of the folding unit 110 described above and therefore need not be specifically set forth. It suffices to say that the folding unit 112 is provided with a pair of lower folding members 274 mounted on a rotatable shaft 276 and a pair of cooperating upper folding members 278 mounted on a rotatable shaft 280 for folding trailing end flaps of the blanks. The folding members 274 and 278 correspond to the above described folding members 200 and 206 of the folding unit 110. The folding unit 112 is also provided with folding members 282 mounted on a rotatable shaft 284 and fixed folding bars 286 for folding the leading end flaps. The folding members 282 and the folding bars 286 correspond to the above described folding members and bars 230 and 238. As the blanks advance from the trailing flap folding members to the leading flap folding members, the trailing flaps are retained in folded condition by elongated bars 288 (see Figs. 31–33). These bars are interrupted to permit folding of the leading flaps and oscillating hold-down members 290 mounted on shaft 292 are provided for retaining the folded trailing end flaps until the blanks have passed beneath the folding bars 286. The members 290 are identical to the corresponding members 244 of the folding member 110. If desired the folding unit 112 may also be provided with a lifting member 294 identical to the above described lifting member 252 and mounted on a rotatable shaft 296.

The blanks are delivered from the folding unit 112 by the feed chains 258 to the glue applying unit 114 which applies the patches 92 of glue to the folded end flaps. The glue applying unit may be of any well known construction and the particular embodiment illustrated includes a pair of glue applying wheels 298 mounted on a rotatable shaft 300 journaled between the sub-frame members 134. A pair of glue supply containers 302 are provided and glue is transferred from these containers to the wheels 298 by rollers 304 and 306 mounted on shafts 308 and 310. The shaft 300 is driven from a drive shaft 312 through suitable gears fixed on the shafts 312, 268 and 300. The gear on the shaft 300 which is designated by the numeral 314 also meshes with a gear 316 on the transfer roller shaft 310 and a pair of gears 318 are mounted on the shaft 310 for meshing engagement with gears 320 on the transfer roller shafts 308.

The end folding unit 116 includes a centrally located lower endless belt 322 which is wrapped around a pulley 324 mounted on the shaft 268 and also around a pulley 326 mounted on a rotatable shaft 328 extending between and journaled in the sub-frame members 132. The upper run of the belt 322 rides over suitable track means which in the embodiment illustrated is provided by a plurality of rollers 330 and upper endless belt 332 cooperates with the belt 322 to feed the blanks from the gluing unit into the end folding unit. The belt 332 is wrapped around a large pulley 334 and a relatively small pulley 336. Pulley 334 is mounted on the rotatable shaft 300 and the roller or pulley 336 may be supported in any desired manner. The lower run of the belt 332 is preferably pressed against the cooperating belt 322 by means of a spring pressed roller assembly 338. The ends of the blanks are supported by a pair of lower endless belts 340 which have the upper runs thereof passing over suitable track means, not shown. Each of the endless belts 340 is wrapped around a pulley 342 mounted on a rotatable shaft 344 journaled between the sub-frame members 134 and another pulley 346 mounted on a rotatable shaft 348 journaled between the sub-frame members 132. As shown best in Figs. 3 and 7 the shaft 344 is driven from the rotatable shaft 312 through gears 350, 351 and 352 fixed on the shafts 312, 268 and 344, respectively, and a suitably supported idler gear 253. The shaft 348 is driven from a drive shaft 354 having a gear 356 mounted thereon which gear meshes with a gear 360 on the shaft 348. Gear 360 meshes with idler gear 358 which in turn meshes with gear 382 on shaft 378. Folding of the box blank ends is accomplished by a pair of twisted endless belts 362 each of which is wrapped around a pulley 364 on a rotatable shaft 366 and a relatively small pulley 368 supported in any desired manner. The shaft 366 is driven from the shaft 348 by means of gears 370 and 372.

After the ends of the blanks have been folded by the twisted belts the blanks are passed between pairs of squeeze rollers 374 and 376, respectively, mounted on rotatable shafts 378 and 380. These rollers function to press the glue patches tightly against the folded diagonal corner portions of the box sides. The shaft 378 is driven from the idler gear 358 through a gear 382 mounted thereon and the shaft 380 is driven from the shaft 378 through gears 385 and 386. While the blanks pass between the squeeze rollers positive control of the blanks is maintained by an endless belt 384 which is wrapped around a pulley 387 mounted on the shaft 366 and a pulley 388 mounted on a rotatable shaft 390. The belt 384 also passes over an idler pulley 392 which is supported in any suitable manner. The lower run of the belt 384 is positioned over and is pressed against the endless belt 322. A suitable spring pressed roller assembly 394 is provided for maintaining the belt 384 in engaging position with the belt 322.

The blanks emerging from these squeeze rollers enter the delivery mechanism 118 which includes a pair of endless belts 396 each of which is wrapped around a pulley 398 mounted on the shaft 328 and a second pulley 400 rotatably supported at the end of a bracket 402. The upper run of each belt 400 passes over any suitable track means which may be in the form of a plurality of rollers 404. The delivery mechanism also includes a pair of upper endless belts 406 which cooperate with the lower belts 396 for maintaining the folded end flaps under pressure and for feeding the blanks. Each of the belts 406 is wrapped around a pulley 408 mounted on the shaft 390 and pulleys 410 and 412 mounted at the opposite ends of an adjustable arm 414. The adjustable arm 414 of the delivery mechanism is conventional and as will be understood, the army may be adjusted so that the mechanism 118 delivers the blanks in either understacked or overstacked relationship. A suitable spring pressed roller unit 416 is provided for resiliently urging the lower portions of the belts 406 against their cooperating belts 396. The rotatable shaft 328 is driven by an idler gear 418 which meshes with the gear 382 on the shaft 378 and a gear 420 on the shaft 328. The rotatable shaft 390 is driven by the shaft 328 through gears 422 and 424.

The conveying unit 120 for receiving and conveying folded blanks in stacked relationship is illustrated in Figs. 1, 4, 5, 8 and 9. As will be seen from the following description, this unit may be easily adjusted for receiving blanks in either understacked or overstacked relationship and for receiving blanks of various sizes. The frame 106 of the unit 120 includes a pair of channel members 430 each having one end supported on the main frame section 104 and the other end supported by a leg 432. A lower conveyor is mounted on the frame 106 and includes a conveyor frame 434 pivotally mounted at one end to the frame 106 by a shaft 436 which extends through bracket members 438 and 440 connected to the conveyor frame 434 and frame 106, respectively. A large drum 442 is fixed on the rotatable shaft 436 and an endless belt 444 is wrapped around the drum and a roller 446 mounted at the opposite end of the conveyor frame. Preferably a plurality of rollers 448 are mounted on the conveyor frame to support the upper run of the endless belt. An adjustable lifting device is provided for supporting the end of the conveyor frame adjacent the roller 446 whereby the conveyor may be raised or lowered to receive the blanks in either overstacked or understacked relationship. As shown best in Figs. 5, 8 and 9 two lifting devices 450 are provided and each includes a screw rod 452 having its upper end interconnected with one end of a shaft 454 carrying the roller 446. The lower end of each screw rod extends through a pair of bracket members 456 and 458 and a worm nut 460 is threaded on the screw rod between the brackets. A worm 462 is suitably mounted in meshing engagement with the worm nut 460 and is provided with a suitable shaft 464 to which a handle, not shown, may be applied for turning. Thus, upon rotating the worm 462 the worm nut 460 is driven to raise or lower the screw rod which supports the conveyor frame.

The channel members 430 of the frame 106 provide tracks for a carriage 466 having a pair of side plates 468. Each of the side plates is mounted on one of the channel members by a plurality of rollers or wheels 470, 472, 474 and 476. An endless pressure belt 478 is mounted on the carriage 466 and is adjustable vertically relative to the conveyor 44 whereby to facilitate handling of various sizes of blanks. The pressure belt 478 is wrapped around a large drum 480 which is mounted on a rotatable shaft 482. The shaft 482 is journaled in a pair of spaced lever arms 484 which are carried by a rotatable shaft 486 and pivotally connected to the carriage thereby. The opposite end of each lever arm is provided with a gear sector 488 which meshes with a worm 490 mounted on the carriage. The worm may be rotated by means of a handle 492 whereby the lever is pivoted to raise and lower the drum 480. The opposite end of the pressure belt 478 is wrapped around a pair of small rollers 494 and 496 which are carried at the end of a frame 498. One end of the frame 498 is pivotally mounted on the rotatable shaft 482 and the opposite end of the frame is supported by a pair of lifting devices 500. The lifting devices 500 are substantially identical to the above described lifting devices 450 and each includes a screw shaft 502 pivotally connected to the carriage as at 504 and extending through a bifurcated bracket 506 connected to the frame 498. A worm nut 508 is threaded onto the screw rod between the arms of the bifurcated bracket, which worm nut is adapted to be rotated by a worm 510. The worms 510 of both of the lifting devices 500 are keyed to a common shaft 512 which shaft may be rotated by a suitable handle, not shown. With this structure it is seen that the pressure belt 478 may be adjusted vertically relative to the conveyor 444 and may be easily maintained substantially parallel to the conveyor or may be inclined slightly thereto if desired.

The lower run of the pressure belt 478 is yieldably biased downwardly by a plurality of pressure rollers 514. Each of the pressure rollers 514 is loosely supported by the frame 498 so that the rollers bear against the pressure belt with a pressure created by their own weight. While this simplifies the structure it is necessary to prevent the pressure rollers from tilting along their longitudinal axes, or in other words to prevent the pressure rollers from tilting transversely of the conveyor. Thus, opposite ends of each pressure roller are connected to upstanding rack members 516 which slidably extend through opposite sides of the frame 498. An elongated gear member 518 extends between and meshes with the rack members at opposite ends of each pressure roller whereby the opposite ends move in unison. This gear member preferably is in the form of a shaft having gears 519 fixed to opposite ends thereof.

The belts 444 and 478 of the unit 120 are driven from a speed reducer 520. A sprocket 522 is fixed to the output shaft of the speed reducer and a drive chain 524 is wrapped around this sprocket and sprockets 526 and 528 fixed to the shafts 436 and 486 respectively. The chain 524 also passes around suitable idler sprockets 530 and 532. The shaft 482 carrying the drum 480 is driven from the shaft 486 by means of gears 534 and 536. It will be appreciated that this arrangement of the driving means permits adjustment of the positions of the conveyor and pressure belts.

In order to drive the various units and mechanisms of the apparatus in timed relationship with each other the above described drive shafts 148, 186, 198, 312 and 354 and the speed reducer 520 are driven from a common source of power. This source of power may be provided by any suitable motor, not shown, operable to drive a pulley 540 keyed to a shaft 542 rotatably supported along one side of the apparatus frame as shown best in Fig. 2. The shaft 542 also carries a bevel pinion 544 which meshes with a bevel gear 546 mounted on the shaft 148. Similar beveled gears 548, 550, 552 and 554 are mounted on the shafts 186, 198, 312 and 354 respectively and are driven by beveled pinions 556, 558, 560 and 562. The beveled pinions 556 through 562 are mounted on pinion shafts 564, 566, 568 and 570 which are similar to the shaft 542 and are rotatably supported by any suitable means, not shown. The various pinion shafts are connected by a plurality of shafts 572 and coupling members 574 in the manner illustrated in Figs. 2, 3 and 4. The speed reducer 520 is connected with the pinion shaft 570 through a variable speed drive mechanism 576. In the particular embodiment illustrated sprocket wheels 578 and 580 are mounted on the pinion shaft 570 and input shaft 582 of the speed reducing mechanism 576 respectively, and are connected by the drive chain 584. The variable speed reducing mechanism output shaft 586 is similarly connected with the input shaft of the speed reducer 520 through sprocket wheels 588, 590 and a drive chain 592. With the drive means described above it is seen that the various units of the apparatus may be individually assembled or removed and replaced without disturbing the drive means of the other units. Furthermore, by placing the beveled pinion and gears and drive shafts 572 along one side of the apparatus frame, the area within the apparatus frame is left clear for the folding and blank processing mechanisms.

The process for folding the blanks by the apparatus of this invention is as follows. The blanks are fed by the feeding unit 108 and timing chains 154 to the folding unit 110. As shown in Figs. 10–13 the blanks are arranged so that their side portions 44 and 46 are arranged in leading and trailing relationship with the scored bend lines 48 and 50 extending transversely of the path of travel. As the blanks enter the folding unit 110 the ends 52 and 54 of the blanks are gripped between the two pairs of cog belts 168 and 170 and as set forth above the cog belts are undulated so that the blanks are bowed or bent substantially parallel to the fold lines 48 and 50 as shown in Figs. 14–17. This feature positively prevents the blanks from bowing or bending in directions extending transversely of the fold lines 48 and 50 so that folding of the blank side portions may be accomplished relatively easily. As each blank is advanced from the position shown in Figs. 10 and 14 past the rotatable folding members 200 and 206 the folding arms 204 engage the trailing edge of the trailing side portion 46 and fold the trailing side portions about 90° as shown in Figs. 11 and 15. It is important to note that the arms 204 engage the trailing side 46 of the blank substantially as far from the fold line 50 as possible whereby maximum leverage is obtained for folding the side and any possibility of buckling the side is further reduced. At the same time the diagonal corner portions 88 and 90 are folded by the bars 228 in the manner described above. As the blank advances to the positions shown in Figs. 12 through 17 the finger portions 210 of the rotatable folding members 206 engage and further fold the trailing side 46 about 90° and hold the side in its finally folded position until its blank passes beneath the hold down bar 242.

After the blank and the rotatable folding members have advanced to the positions shown in Figs. 12 and 16 the rate of rotation of the folding members 200 is retarded to disengage the arms 204 from the blank and prevent interference. This is accomplished by driving the rotatable folding members through the means shown best in Figs. 2, 6 and 35. This drive means includes a drive chain 594 wrapped around a sprocket wheel 596 mounted on the drive shaft 198. The chain is also wrapped around sprocket wheels 598 and 600 mounted on the shafts 254 and 232 respectively and a sprocket wheel 602 mounted on a shaft 604 journaled at one side of the apparatus frame as shown in Fig. 2. The shaft 212 of the folding members 206 is driven from the shaft 604 through a drive chain 606 and sprocket wheels 608 and 610. A pinion 612 is also mounted on the shaft 604 and meshes with a gear 614 keyed to a shaft 616 which extends through and is rotatable within a hollow shaft 202. At the opposite end of the shaft 616 is keyed a sun gear 618 which meshes with a planet gear 620 rotatable on a shaft 622. A second planet gear 624 is rotatably mounted on the shaft 622 and is fixed with respect to the gear 620. The planet gear 624 meshes with a sun gear 626 keyed to the shaft 202 and the planet gear shaft 622 is integral with or carried by a bracket 628 which is rotatably mounted on a hub 630 of the sun gear 626. In order to drive the shaft 202 at variable speeds the planet gear shaft 622 is retained against completely revolving around the sun gears but is oscillated back and fourth. This is accomplished by connecting the planet gear shaft by means of a rod 632 to an eccentric pin 634 carried by a disc 636 mounted on the shaft 162. With this structure it is seen that as the planetary gears are moved toward the left as viewed in Fig. 6 the speed of the shaft 202 and thus the folding members 200 will be increased to accomplish folding of the trailing side of the blank and as the planetary gears are moved toward the right the speed of the shaft 202 will be reduced sufficiently to disengage the folding arms from the blank.

After the trailing side of the blank has been folded the blank is advanced by the undulated cog belts through the positions shown in Figs. 19–26 and the leading edge of the leading side portion is engaged by the fingers 236 so that the leading side is folded about 90° whereupon the blank enters beneath the folding bars 238 and the leading side is completely folded. At the same time the diagonal corner portions of the leading side are folded by the bars 240 in the manner described above and if desired, the rotatable lifting member 252 may be employed to support the leading side during the initial folding thereof.

The blanks are then advanced through the folding unit 112 and the leading and trailing end flaps 68, 70, 76 and 78 are folded in the manner illustrated in Figs. 29–33. The operation of the rotatable members 274, 278, 282 and 294 for folding the end flaps is substantially identical to the operation of the corresponding members in the folding unit 110 and therefore need not be fully repeated. Figs. 29, 30 and 31 illustrate how the trailing end flaps are folded by the rotatable members 274 and 278 and these figures show the rotatable folding members in the same positions that the corresponding folding members are shown in Figs. 10, 11 and 13. Figs. 32 and 33 illustrate how the leading end flaps are folded and these figures correspond to Figs. 21 and 22 illustrating the operation of the identical members in the folding unit 110. It is understood that the rotatable members of the folding unit 112 are driven by means substantially identical to the means described above for driving the corresponding elements of the folding unit 110.

After the side portions and end flaps of the blanks have been folded the blanks are conveyed through the glue applying mechanism and the end folding unit 116 wherein glue patches are applied to the blanks and the ends are folded in the manner set forth above. The blanks are then advanced through the pressure rollers so that the glue patches on the end flaps are pressed firmly against the folded diagonal corner portions of the sides and the fully processed blanks are delivered to the conveying unit 120 in either understacked or overstacked relationship.

From the above description it is seen that the present invention has provided a novel box blank processing apparatus which is of relatively simple construction to facilitate relatively economical production and maintenance. Furthermore, it is seen that the present invention has provided a novel method and apparatus whereby blanks may be rapidly and economically folded and any possibility of improper folding which might injure the blanks or jam the apparatus has been substantially reduced. In addition, it is seen that by reason of the relatively simple construction of the apparatus adjustments may be easily made for handling various types and sizes of blanks.

While the preferred embodiment of the present invention has been shown and described herein it is obvious that many structural details may be changed without departing from the spirit and scope of the appended claims.

The invention is claimed as follows:

1. An apparatus for folding leading and trailing portions of a blank moving along a predetermined path of travel with said blank portions joined to the remainder of the blank along bend lines extending transversely of said path of travel, comprising means disposed at one side of said path of travel initially engageable with the trailing edge of said trailing blank portion for partially folding said trailing blank portion toward the opposite side of said path of travel, means for moving a blank and said folding means at predetermined variable relative speeds along said path of travel to accomplish partial folding of said trailing blank portion and then disengagement of said folding means from said trailing blank portion, other means disposed at said opposite side of the path of travel for further folding said trailing blank portion, means spaced along said path of travel from said previously mentioned folding means for initially engaging the leading edge of said leading blank portion and partially folding said leading blank portion, and additional folding means for further folding said leading blank portion.

2. An apparatus for folding leading and trailing portions of a blank moving along a predetermined path of travel with said blank portions joined to the remainder of the blank along bend lines extending transversely of said path of travel, comprising rotatable means mounted for rotation about a fixed axis at one side of said path of travel initially engageable with said trailing portion adjacent the trailing edge thereof for partially folding said trailing portion toward the opposite side of said path of travel, means for rotating said folding means and for conveying said blank for moving said blank and said folding means at predetermined variable relative speeds along said path of travel to accomplish partial folding of said trailing portion and then disengagement of said folding means from said trailing portion, a second rotatable means mounted for rotation about a fixed axis at said opposite side of the path of travel for further folding said trailing portion, a third rotatable means spaced along said path of travel from said second rotatable means initially for engaging the leading portion adjacent the leading edge thereof and partially folding said leading portion, and additional folding means for further folding said leading portion.

3. An apparatus as defined in claim 1 which includes means for bending the body of said blank generally parallel to said bend lines while said portions are being folded to facilitate such folding.

4. An apparatus as defined in claim 1 which includes means engageable with corners of said leading and trailing blank portions while said portions are being folded to fold corners of said portions along diagonal lines.

5. An apparatus as defined in claim 1 which includes elongated means disposed between said second and third mentioned folding means for holding said trailing portion in the folded position, and means movable toward and away from said path of travel for holding said trailing portion in the folded position while the leading portion is being folded.

6. An apparatus as defined in claim 5 wherein said third mentioned folding means is mounted for rotation about an axis extending transversely of said path of travel and said movable holding means is mounted for movement about an axis extending transversely of said path of travel.

7. An apparatus for folding flaps of blanks, as defined in claim 1, wherein said means for moving the blanks comprises conveying means including a plurality of substantially overlapping means continuously maintaining positive control over the blanks until the blanks have been discharged.

8. An apparatus for folding a portion of a blank moving along a predetermined path of travel with said blank portion joined to the remainder of the blank along a bend line extending transversely of said path of travel, comprising means mounted for rotation about a fixed axis for folding said blank portion, and means for moving said blank and said folding means at predetermined variable relative speeds along said path of travel to accomplish folding of the blank portion and then disengagement of the folding means from said blank portion, said last named means including drive means for rotating said folding means about said fixed axis in the direction of movement of the blanks at a variable speed.

9. An apparatus as defined in claim 8 which includes additional folding means disposed adjacent said path of travel for further folding said blank portion.

10. An apparatus for folding a portion of a blank moving along a predetermined path of travel with said blank portion joined to the remainder of the blank along a fold line, comprising means for bowing the remainder of the blank substantially parallel to said fold line, and means for folding said blank portion along said fold line while the remainder of the blank is maintained in a bowed condition.

11. An apparatus for folding a portion of a blank moving along a path of travel with said blank portion joined to the remainder of the blank along a fold line extending transversely of said path of travel, comprising means for conveying said blank and for bowing the body of said blank generally parallel to said fold line, and means for folding said blank portion along said fold line while the body of the blank is maintained in bowed condition.

12. An apparatus as defined in claim 11 wherein said conveying means is undulated to effect bowing of the blank body.

13. An apparatus as defined in claim 12 wherein said conveying means comprises a pair of opposed endless belt-like members disposed for holding the blank therebetween.

14. An apparatus as defined in claim 12 wherein said conveying means comprises two parallel pairs of opposed endless belts disposed to engage opposite ends of the blank.

15. An apparatus as defined in claim 14 wherein each of said endless belts includes teeth means engageable with driving sprocket wheels, whereby all of said belts may be positively driven in predetermined timed relationship with each other.

16. In a box folding apparatus a mechanism for receiving and conveying blanks in stacked relationship, said mechanism comprising a generally horizontally disposed conveyor, a generally horizontally arranged endless belt disposed above said conveyor and supported between spaced roller means, a plurality of elongated pressure rollers extending transversely of and bearing against the lower run of said endless belt, means including a pair of members having teeth yieldably supporting opposite ends of each of said rollers, and a plurality of gear means each meshing with one pair of said members to prevent tilting of the pressure rollers.

17. In a box folding apparatus a mechanism for receiving and conveying blanks in stacked relationship, said mechanism comprising a generally horizontally disposed conveyor, a generally horizontally disposed belt supported between spaced roller means above said conveyor, a plurality of elongated pressure rollers extending transversely of and bearing against the lower run of said endless belt, and means for yieldably supporting said pressure rollers and for preventing tilting of the pressure rollers, said last mentioned means including a toothed member connected to and movable with each end of said pressure rollers, and gear-like means meshing with each of said toothed members, the gear-like means associated with the toothed members at opposite ends of each pressure roller being rigidly interconnected.

18. In a box folding apparatus a mechanism for receiving and conveying blanks in stacked relationship, said mechanism comprising frame means, an elongated generally horizontal conveyor mounted on said frame means, a carriage movably mounted on said frame means, and endless belt generally horizontally arranged over said conveyor, and means supporting said endless belt on said carriage for vertical adjustment realtive to said conveyor, said supporting means including a frame having roller means adjacent opposite ends over which said belt is passed, lever means pivotally mounted on said carriage and pivotally interconnected with one end of said frame, gear means for adjusting said lever means to raise and lower said one end of said frame, and elevating means disposed between said carriage and the opposite end of said frame, said elevating means being adjustable to maintain said belt generally horizontal.

19. An apparatus as defined in claim 18 which includes a plurality of elongated pressure rollers extending transversely of and bearing downwardly against the lower run of said endless belt, means including a pair of members having teeth for yieldably connecting opposite ends of each of said pressure rollers with said frame and a plurality of gear means each meshing with one pair of said members to prevent tilting of said pressure rollers.

20. An apparatus for folding leading and trailing portions of a box blank comprising an elongated main frame, a removable feeding unit mounted as a unit adjacent to and removable as a unit from one end of said main frame for feeding box blanks from a stack thereof, a first removable flap folding unit including subframe means and box engaging means and drive means therefor on said subframe means, said last named unit being mounted as a unit on and removable as a unit from said main frame for folding one of said portions of the box blanks, a second removable flap folding unit including subframe means and box engaging means and drive means therefor on said subframe means, said last named unit being mounted as a unit on and removable as a unit from said main frame for folding the other of said portions of the box blanks, said folding units being removable individually, and means for conveying the blanks from said feeding means past said folding means.

21. An apparatus as defined in claim 20 which includes an individually removable end flap folding unit mounted as a unit on and removable as a unit from said main frame for folding end flaps of said box blanks, and an individually removable blank receiving and conveying unti connected wtih said main frame.

22. A method of folding blanks along predetermined bend lines comprising bowing portions of the blanks generally parallel to and spaced from said bend lines, and subsequently folding the blank along said bend lines while maintaining the blanks in a bowed condition.

23. A method of folding a portion of a blank along a predetermined bend line comprising feeding said blank along a predetermined path of travel, bowing portions of said blank generally parallel to and spaced from said bend line, and subsequently folding said blank portion along said bend line while maintaining the blank in a bowed condition.

24. The method as defined in claim 23 which includes initially applying pressure to a margin of said blank portion spaced from said bend line to fold said blank portion.

References Cited in the file of this patent

UNITED STATES PATENTS

| | | |
|---|---|---|
| 2,112,121 | Sidebotham | Mar. 22, 1938 |
| 2,125,147 | Bergstein | July 26, 1938 |
| 2,133,727 | Staude | Oct. 18, 1938 |
| 2,197,089 | Anderson | Apr. 16, 1940 |
| 2,349,204 | Staude | May 16, 1944 |
| 2,391,170 | La Bombarde | Dec. 18, 1945 |
| 2,462,513 | Kucklinsky | Feb. 22, 1949 |
| 2,547,963 | Neal | Apr. 10, 1951 |
| 2,589,944 | La Bombarde | Mar. 18, 1952 |
| 2,625,778 | Wood | Jan. 20, 1953 |
| 2,647,447 | Andre | Aug. 4, 1953 |
| 2,764,918 | La Bombarde | Oct. 2, 1916 |
| 2,774,286 | La Bombarde | Dec. 18, 1956 |

UNITED STATES PATENT OFFICE
CERTIFICATE OF CORRECTION

Patent No. 2,911,889                                    November 10, 1959

Ormonde P. Welsh

It is hereby certified that error appears in the printed specification of the above numbered patent requiring correction and that the said Letters Patent should read as corrected below.

Column 3, line 23, after "132" strike out "and"; column 5, line 23, after "246" for "an" read -- and --; line 48, for "feding" read -- feeding --; column 8, line 4, for "44" read -- 444 --; column 14, line 7, for "unti" read -- unit --; line 8, for "wtih" read -- with --.

Signed and sealed this 24th day of May 1960.

(SEAL)
Attest:

KARL H. AXLINE                                  ROBERT C. WATSON

Attesting Officer                               Commissioner of Patents